Jan. 10, 1928.
C. POWERS
1,655,737
CRUST BREAKING ATTACHMENT FOR BEET CULTIVATORS
Filed Feb. 24, 1927
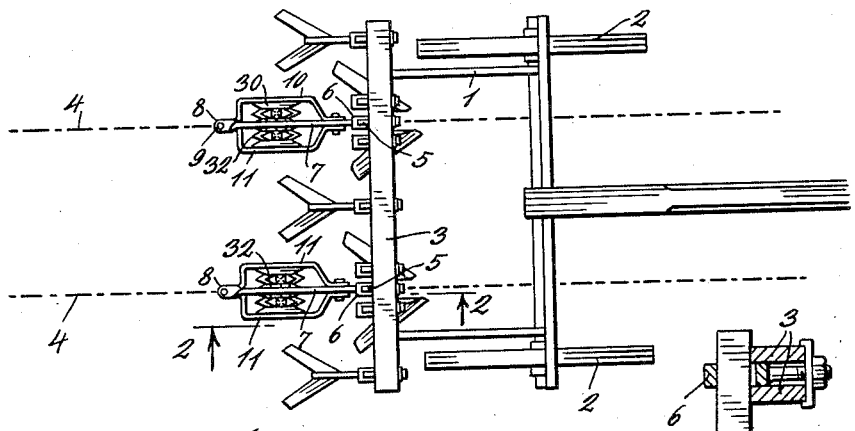
Fig. 1.
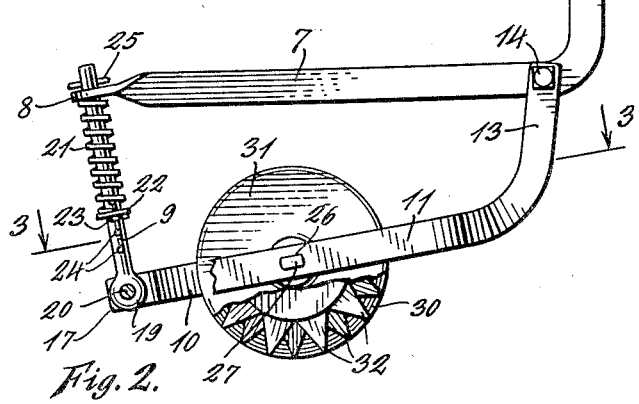
Fig. 2.
Fig. 3.
Inventor
Cody Powers.
By A. J. O'Brien
Attorney Patented Jan. 10, 1928.

1,655,737

UNITED STATES PATENT OFFICE.

CODY POWERS, OF GREELEY, COLORADO.

CRUST-BREAKING ATTACHMENT FOR BEET CULTIVATORS.

Application filed February 24, 1927. Serial No. 170,515.

This invention relates to improvements in attachments for beet cultivators and has reference more particularly to an improved device for breaking the crust over the rows where beet seeds have been planted.

Beet seeds are usually planted by means of a horse drawn planter that deposits the seeds and which covers them and presses the ground down about the seed. The pressing and covering is usually accomplished by the wheels that support the planter and when the soil is loose, the surface of the ground directly over the seed rows will be pressed down below the surface between the rows. If the ground gets thoroughly wet and is then subjected to the drying action of the sun and air, a hard crust will be formed directly over the seeds and this will often get so hard that the plant shoots are unable to penetrate it and therefore die. It is customary to go over the field with a crusher, which is intended to break the crust, but this will not break the crust over the rows where the surface of the rows has been pressed down a considerable distance below the level of the ground between the rows. It often happens therefore that a great many of the plants wither and die because they are unable to penetrate the crust.

It is the object of this invention to provide a cheap, simple device that can be attached to the ordinary cultivator in such a manner that when the cultivator is used for cultivating the ground and cutting out the weeds between the rows, the hard crust immediately over the seeds will be broken so as to permit the tender shoots of the plant to come through to the light and air. If the ground is first subjected to the operation of a roller or to a harrow, it must be gone over twice, whereas with my tool attached to the ordinary cultivator, the combined results can be obtained by a single operation.

The cultivators ordinarily employed in the cultivation of beets consists of a framework mounted on two spaced wheels. The framework is usually long enough to cover three rows. A cross bar extends across the framework parallel with the axis of the wheels and serves as a member to which the several tools are attached. The cultivating tools consist of teeth, duck feet, and hoes for cutting weeds and have their shanks secured to the cross bar so that they will traverse the ground between the crop rows for the purpose of cutting the weeds and loosening the ground.

My improved crust breaking attachment is also provided with a shank and is attached to the transverse bar in the same manner as the other tools, but in such a position that it will traverse the ground directly over the planted seed and thus break the crust above the seeds.

My improved crust breaker, briefly described, consists of a toothed roller rotatably mounted in a frame in such a manner that it will rest on the ground with sufficient force to break the crust.

Having thus briefly described the invention, I will now proceed to describe the same in detail and reference for this purpose will now be had to the accompanying drawing in which the preferred embodiment thereof has been illustrated, and in which:

Fig. 1 is a top plan view of a cultivator showing my improved crust breaker secured in place thereon;

Fig. 2 is a side elevation, partly in section taken on line 2—2, Fig. 1, of the crust breaker, portions being broken away to better disclose the construction; and Fig. 3 is a section taken on line 3—3, Fig. 2.

In the drawing numeral 1 represents the frame of a cultivator. This frame is supported on wheels 2 and carries a tool bar 3 to which the various cultivating implements are attached, and numeral 4 indicates dot and dash lines that represent the rows of seeds. The tool bar is usually constructed of two parallel spaced steel bars 3 (Fig. 2) to which the shank 5 of a tool is clamped by means of an eye bolt 6. My improved crust breaker consists of a shank 5 having a horizontal portion 7 that extends rearwardly and terminates in a flattened part 8, which is perforated for the reception of a bolt 9. A frame work comprising two reversely arranged side members 10 and 11 whose forward ends 12 and 13 are bent towards each other and upwardly inclined in the manner shown in Figures 2 and 3. These ends are pivotally attached to the shank by means of a bolt 14. The rear ends of members 10 and 11 are bent towards each other in the manner indicated by numerals 15 and 16, and have their ends 17 and 18 bent into parallel relation. The lower end of bolt 9 is provided with an eye 19, which is located between the parts 17 and 18 and secured to the latter by means of a bolt 20. A spring 21 surrounds the upper end of bolt 19 and abuts its ends against the under surface of the part 8 and the upper surface of the washer 22, which is held in place by means of a pin 23. Bolt 9 is provided with several holes 24 so that the tension of the spring can be adjusted to any extent desired. A pin 25 extends through the upper end of bolt 9 and limits its movement in a downward direction. Side members 10 and 11 are provided with oblong openings 26 for the reception of the flattened ends 27 of the shaft 28. A roller which is constructed in a peculiar manner, presently to be described, is mounted for rotation on the shaft 28. This roller has been shown as composed of several separate sections held together by means of bolts or rivets 29. In the construction of a roller as shown, the two outer sections which have been indicated by reference numeral 30, are circular disks having inclined surfaces 31. The other sections are disks provided with a plurality of pyramidal teeth 32, which are staggered in relation to each other. When this implement is secured to the cultivator frame in such a position that the roller will be located directly above the seed rows 4, the projection from the disks will serve to break the crust above the seeds during the progress of the cultivation.

It is evident from inspection of Figure 1 that the usual cultivating tools must never be brought into contact with that part of the ground directly over the seeds and therefore there is a strip of unbroken soil left directly over the seed bed. This strip has a width substantially equal to the width between the inclined sides 31 and is therefore acted upon by the projections 32, whose action breaks the crust sufficiently to permit the shoots to pass through. The spring 21 is selected of such strength and adjusted to such a tension that the roller will be pressed against the surface with sufficient force to break the crust.

From the above it will be apparent that I have provided a simple means which may readily be attached to the tool bar of an ordinary cultivator and which will successfully break the crust over the seeds during the progress of the cultivation.

Having now described the invention what is claimed as new is:

1. A crust breaker comprising, in combination, a shank adapted to be secured to the tool bar of a cultivator, a frame having two spaced side members, means comprising a horizontal pivot for connecting one end of the frame to the shank whereby the frame may be oscillated vertically and a toothed roller carried by the frame and rotatably about an axis extending transversely of the frame.

2. A crust breaker comprising, in combination, a shank adapted to be secured to the tool bar of a cultivator, a frame having two spaced side members, the front end of said frame being attached to the shank by means of a horizontal pivot, a resilient connection between the rear end of the frame and a portion of said shank, a shaft extending from one side member to the other and a roller mounted for rotation about the axis of the shaft.

3. A device of the class described, comprising in combination an L-shaped supporting member having a vertical shank portion adapted to be secured to the tool bar of a cultivator, a frame having two spaced parallel side members whose front ends are bent towards each other and inclined upwardly, said front ends being connected with the supporting member by means of a horizontal pivot, a toothed roller pivotally secured to the frame and resilient means between the rear end of the supporting member and a rear end of the frame.

4. A device of the class described, comprising in combination an L-shaped supporting member having a vertical shank portion adapted to be secured to the tool bar of a cultivator, a frame having two spaced parallel side members whose front ends are bent towards each other and inclined upwardly, said front ends being pivotally connected to the supporting member, a toothed roller pivotally secured to the frame and resilient means between the rear end of the supporting member and a rear end of the frame for adjusting the pressure between the roller and the ground.

5. A crust breaking device comprising a frame, a roller pivotally attached to the frame, said roller comprising two circular end disks with beveled edges and a plurality of toothed disks located between the end disks.

In testimony whereof I affix my signature.

CODY POWERS.